United States Patent
Itou et al.

(10) Patent No.: US 11,148,684 B2
(45) Date of Patent: Oct. 19, 2021

(54) VEHICLE CONTROL DEVICE

(71) Applicant: HITACHI AUTOMOTIVE SYSTEMS, LTD., Hitachinaka (JP)

(72) Inventors: Hiroaki Itou, Hitachinaka (JP); Shigenori Hayase, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 45 days.

(21) Appl. No.: 16/605,884

(22) PCT Filed: Apr. 10, 2018

(86) PCT No.: PCT/JP2018/014993
§ 371 (c)(1),
(2) Date: Oct. 17, 2019

(87) PCT Pub. No.: WO2018/198746
PCT Pub. Date: Nov. 1, 2018

(65) Prior Publication Data
US 2021/0122396 A1    Apr. 29, 2021

(30) Foreign Application Priority Data
Apr. 27, 2017   (JP) .............................. JP2017-087826

(51) Int. Cl.
*B60W 60/00*    (2020.01)
*B60W 40/09*    (2012.01)
*B60W 50/14*    (2020.01)

(52) U.S. Cl.
CPC ........ *B60W 60/0051* (2020.02); *B60W 40/09* (2013.01); *B60W 50/14* (2013.01); *B60W 60/001* (2020.02); *B60W 2540/30* (2013.01)

(58) Field of Classification Search
CPC ........... B60W 60/0051; B60W 60/001; B60W 40/09; B60W 50/14; B60W 2540/30
See application file for complete search history.

(56) References Cited

U.S. PATENT DOCUMENTS 9,921,580 B2 *   3/2018   Park ..................... B60W 40/09
10,417,910 B2 *  9/2019   Scofield .............. B60W 30/143
(Continued)

FOREIGN PATENT DOCUMENTS

JP      2008/180591 A    8/2008
WO    WO-2015/159341 A1   10/2015

OTHER PUBLICATIONS

Machine Translation of JP2008-180591 retrieved from espacenet on Feb. 27, 2021 (Year: 2021).*

(Continued)

*Primary Examiner* — Thomas Ingram
(74) *Attorney, Agent, or Firm* — Foley & Lardner LLP

(57) ABSTRACT

The present invention addresses the problem of performing automatic driving in accordance with driving characteristics of a driver while considering a vehicle peripheral state, even in the case where the vehicle peripheral state during manual driving is different from the vehicle peripheral state during the automatic driving. The present invention is a vehicle control device 120 that can switch between manual driving in which a vehicle is caused to travel by the operation of a driver and automatic driving in which the vehicle is caused to travel automatically in accordance with a traveling plan. The vehicle control device 120 is provided with a vehicle control planning unit 123 that devises the traveling plan, and a verification unit 124 that verifies a vehicle traveling state on the basis of the traveling plan. The vehicle control device 120 devises the traveling plan in accordance with learning related to driving characteristics of the driver during the manual driving, and the result of learning related to the verification result from the verification unit 124.

6 Claims, 16 Drawing Sheets

(56) References Cited

U.S. PATENT DOCUMENTS

| | | | | |
|---|---|---|---|---|
| 10,514,269 B2* | 12/2019 | Kang | ................... | G05D 1/0223 |
| 10,571,919 B2* | 2/2020 | VanBlon | ................ | B60K 35/00 |
| 10,656,645 B1* | 5/2020 | Sturges | ................ | G05D 1/0088 |
| 10,740,850 B1* | 8/2020 | Slusar | .................... | G06Q 40/08 |
| 10,775,184 B2* | 9/2020 | Ho | ..................... | G01C 21/3492 |
| 10,782,701 B2* | 9/2020 | Cronin | ............... | G01C 21/3461 |
| 10,885,592 B2* | 1/2021 | Hsu-Hoffman | ........ | G06Q 40/08 |
| 2016/0347328 A1* | 12/2016 | Takehara | ............ | B60W 50/082 |
| 2017/0219364 A1* | 8/2017 | Lathrop | ............. | G01C 21/3453 |
| 2018/0237013 A1* | 8/2018 | Inuzuka | ................ | B60W 50/14 |
| 2019/0168760 A1* | 6/2019 | Ryne | .................... | B60W 40/09 |

OTHER PUBLICATIONS

International Search Report with English translation and Written Opinion issued in corresponding application No. PCT/JP2018/014993 dated Jun. 19, 2018.

* cited by examiner

FIG. 6

| # | ITEM | DRIVING CHARACTERISTICS |
|---|------|------------------------|
| 1 | ACCELERATION | a0 [m/s$^2$] |
| 2 | MAXIMUM STEERING ANGLE | Θ0 [deg] |
| 3 | MERGING POINT (DISTANCE TO MERGING TERMINAL END) | L0 [m] |

FIG. 7
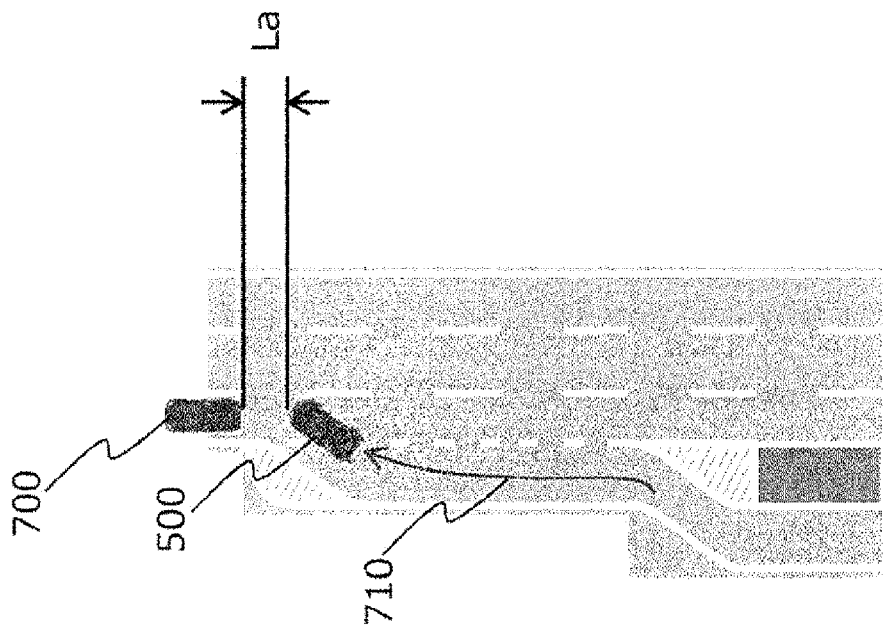
(b) TIME =T0+Δt1
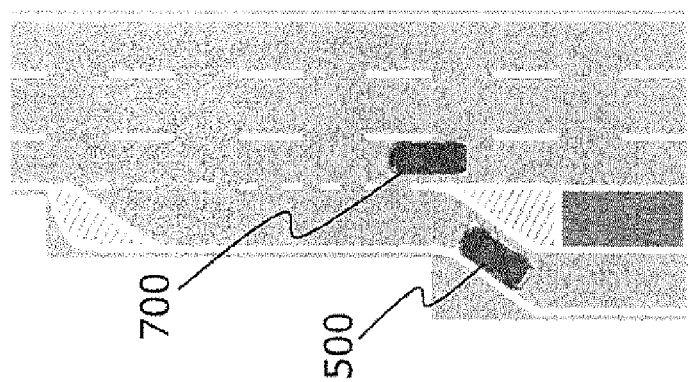
(a) TIME =T0

FIG. 8

| ALARM ID | ITEM |
|---|---|
| 1 | INSUFFICIENT DISTANCE TO PRECEDING VEHICLE |
| 2 | INSUFFICIENT DISTANCE TO FOLLOWING VEHICLE |
| 3 | EXCESS SPEED |
| 4 | EXCESS ACCELERATION |
| 5 | INSUFFICIENT DISTANCE TO MERGING TERMINAL END |

FIG. 9

(a) BEFORE CHANGE

| # | ITEM | DRIVING CHARACTERISTICS |
|---|---|---|
| 1 | ACCELERATION | a0 [m/s²] |
| 2 | MAXIMUM STEERING ANGLE | Θ0 [deg] |
| 3 | MERGING POINT (DISTANCE TO MERGING TERMINAL END) | L0 [m] |

(b) AFTER CHANGE

| # | ITEM | DRIVING CHARACTERISTICS |
|---|---|---|
| 1 | ACCELERATION | a1 [m/s²] |
| 2 | MAXIMUM STEERING ANGLE | Θ0 [deg] |
| 3 | MERGING POINT (DISTANCE TO MERGING TERMINAL END) | L0 [m] |

(NOTE) a1 < a0

(c) AFTER CHANGE

| # | ITEM | DRIVING CHARACTERISTICS |
|---|---|---|
| 1 | ACCELERATION | CHANGED, REDUCED |
| 2 | MAXIMUM STEERING ANGLE | NO CHANGE |
| 3 | MERGING POINT (DISTANCE TO MERGING TERMINAL END) | NO CHANGE |

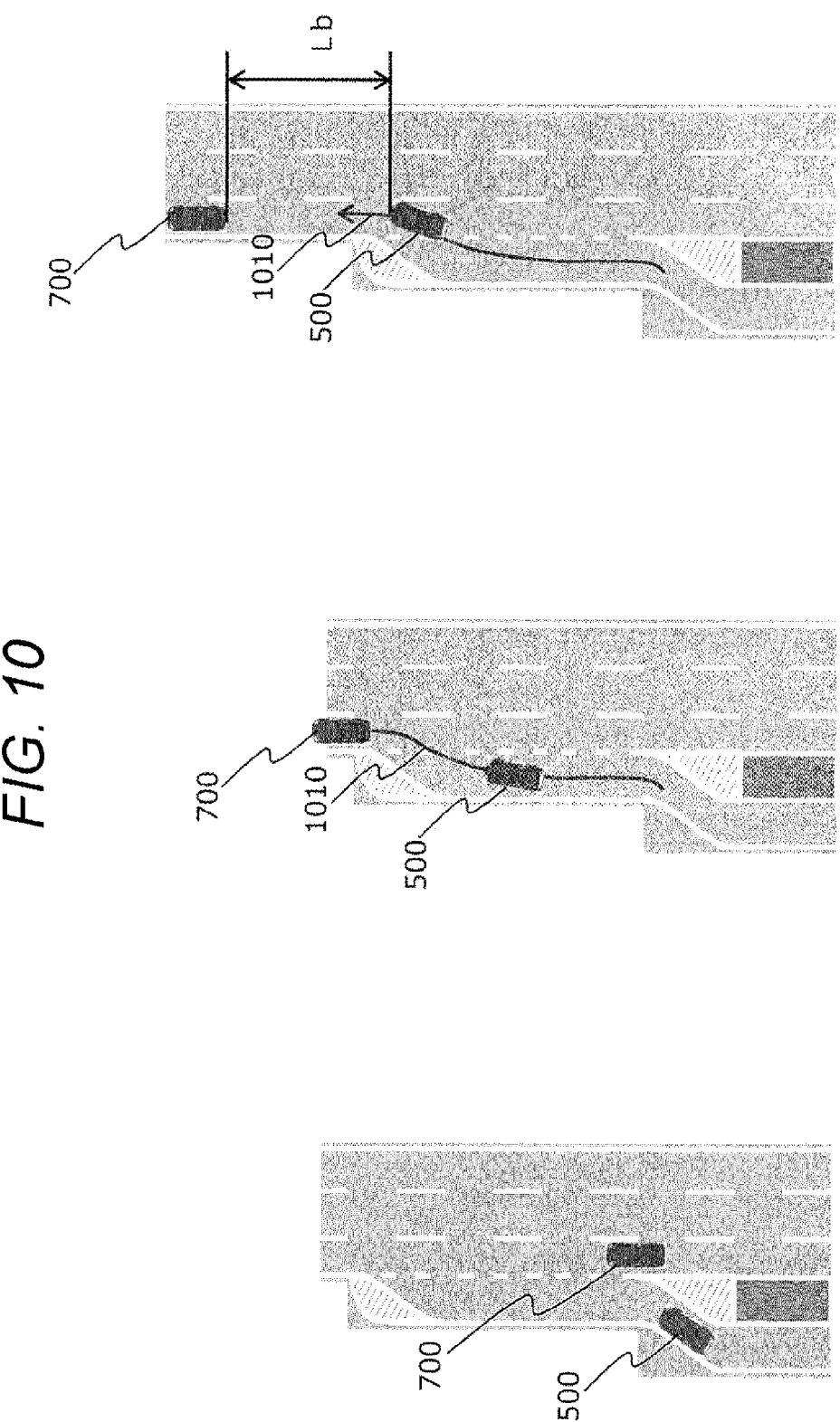

FIG. 11

(a) BEFORE CHANGE

| # | ITEM | DRIVING CHARACTERISTICS |
|---|---|---|
| 1 | ACCELERATION | $a0 \ [m/s^2]$ |
| 2 | MAXIMUM STEERING ANGLE | $\Theta 0 \ [deg]$ |
| 3 | MERGING POINT (DISTANCE TO MERGING TERMINAL END) | $L0 \ [m]$ |

(b) AFTER CHANGE

| # | ITEM | DRIVING CHARACTERISTICS |
|---|---|---|
| 1 | ACCELERATION | $a1 \ [m/s^2]$ |
| 2 | MAXIMUM STEERING ANGLE | $\Theta 0 \ [deg]$ |
| 3 | MERGING POINT (DISTANCE TO MERGING TERMINAL END) | $L1 \ [m]$ |

(NOTE) $L1 < L0$

FIG. 13

| # | ITEM | REPRESENTATIVE DRIVING CHARACTERISTICS | PRIORITY |
|---|---|---|---|
| 1 | ACCELERATION | $a_m \ [m/s^2]$ | 3 |
| 2 | MAXIMUM STEERING ANGLE | $\Theta_m \ [deg]$ | 2 |
| 3 | MERGING POINT (DISTANCE TO MERGING TERMINAL END) | $L_m \ [m]$ | 1 |

FIG. 15

| # | ITEM | DRIVING CHARACTERISTICS |
|---|------|------------------------|
| 1 | ACCELERATION | $a_r \ [m/s^2]$ |
| 2 | MAXIMUM STEERING ANGLE | $\theta_r \ [deg]$ |
| 3 | MERGING POINT (DISTANCE TO MERGING TERMINAL END) | $L_r \ [m]$ |

FIG. 16

(a) BEFORE CHANGE

| # | ITEM | DRIVING CHARACTERISTICS |
|---|---|---|
| 1 | ACCELERATION | a0 [m/s$^2$] |
| 2 | MAXIMUM STEERING ANGLE | Θ0 [deg] |
| 3 | MERGING POINT (DISTANCE TO MERGING TERMINAL END) | L0 [m] |

(b) AFTER CHANGE

| # | ITEM | DRIVING CHARACTERISTICS |
|---|---|---|
| 1 | ACCELERATION | ar [m/s$^2$] |
| 2 | MAXIMUM STEERING ANGLE | Θ0 [deg] |
| 3 | MERGING POINT (DISTANCE TO MERGING TERMINAL END) | L0 [m] |

VEHICLE CONTROL DEVICE

TECHNICAL FIELD

The present invention relates to a vehicle control device that automatically controls a vehicle to a destination by automatic steering or automatic speed control.

BACKGROUND ART

In recent years, in order to reduce the burden on a driver, an automatic driving technology for automatically performing steering and speed control of a vehicle has been examined.

Here, in the aforementioned automatic driving, driving characteristics are generally set such that a certain degree of satisfaction is acquired even though the driver drives under various road environments and weather. Thus, there is a problem that the driver feels a sense of incompatibility when driving characteristics (an acceleration method, a traveling speed, and in-vehicle distance) in a case where the driver drives by himself or herself are different from driving characteristics of automatic driving.

In order to solve the aforementioned problems, PTL 1 discloses a method of suppressing the sense of incompatibility by learning the driving characteristics of the driver during the manual driving and performing automatic driving control while referring to the learned driving characteristics during the automatic driving.

CITATION LIST

Patent Literature

PTL 1: WO2015/159341

SUMMARY OF INVENTION

Technical Problem

Here, although PTL 1 discloses a method of correcting the driving characteristics in an automatic driving mode by using the driving characteristics during the manual driving, when the vehicle peripheral state such as the presence or absence of a vehicle traveling in front and back of a host vehicle is different during the manual driving and during the automatic driving, there is a problem that safe and smooth traveling may not be performed by simply using the driving characteristics learned during the manual driving.

The present invention has been made in view of the aforementioned circumstances, and an object of the present invention is to provide a vehicle control device capable of performing automatic driving according to driving characteristics of a driver while considering a vehicle peripheral state during automatic driving.

Solution to Problem

In order to solve the problems, there is provided a vehicle control device capable of switching between manual driving in which a vehicle travels according to an operation of a driver and automatic driving in which the vehicle automatically travels according to a traveling plan. The device includes a vehicle control planning unit that plans the traveling plan, and a verification unit that verifies a traveling state of the vehicle based on the traveling plan. The traveling plan is planned according to learning related to driving characteristics of the driver during the manual driving and a result of learning related to a verification result of the verification unit.

Advantageous Effects of Invention

According to the vehicle control device of the present invention, it is possible to acquire a vehicle control device capable of performing automatic driving according to the driving characteristics of the driver while considering the vehicle peripheral state during the automatic driving.

BRIEF DESCRIPTION OF DRAWINGS

FIG. 6 is a diagram illustrating examples of driving characteristics acquired during the merging of lanes in manual driving.

FIG. 7 is a diagram illustrating an operation example of the merging of lanes in an automatic driving mode.

FIG. 8 is a diagram illustrating examples of alarm items detected by a verification unit.

FIG. 9 is a diagram illustrating an example in which driving characteristics are changed when an alarm occurs.

FIG. 10 is a diagram illustrating an operation example of the merging of lanes in the automatic driving mode after the driving characteristics are changed.

FIG. 11 is diagram illustrating an example in which the driving characteristics are changed when the alarm occurs.

FIG. 13 is a diagram illustrating examples of driving characteristics acquired during the merging of lanes in manual driving.

FIG. 15 is a diagram illustrating examples of driving characteristics in rule-based vehicle control.

FIG. 16 is a diagram illustrating an example in which the driving characteristics are changed when the alarm occurs.

DESCRIPTION OF EMBODIMENTS

Hereinafter, embodiments will be described with reference to the drawings.

First Embodiment

Figure 1:
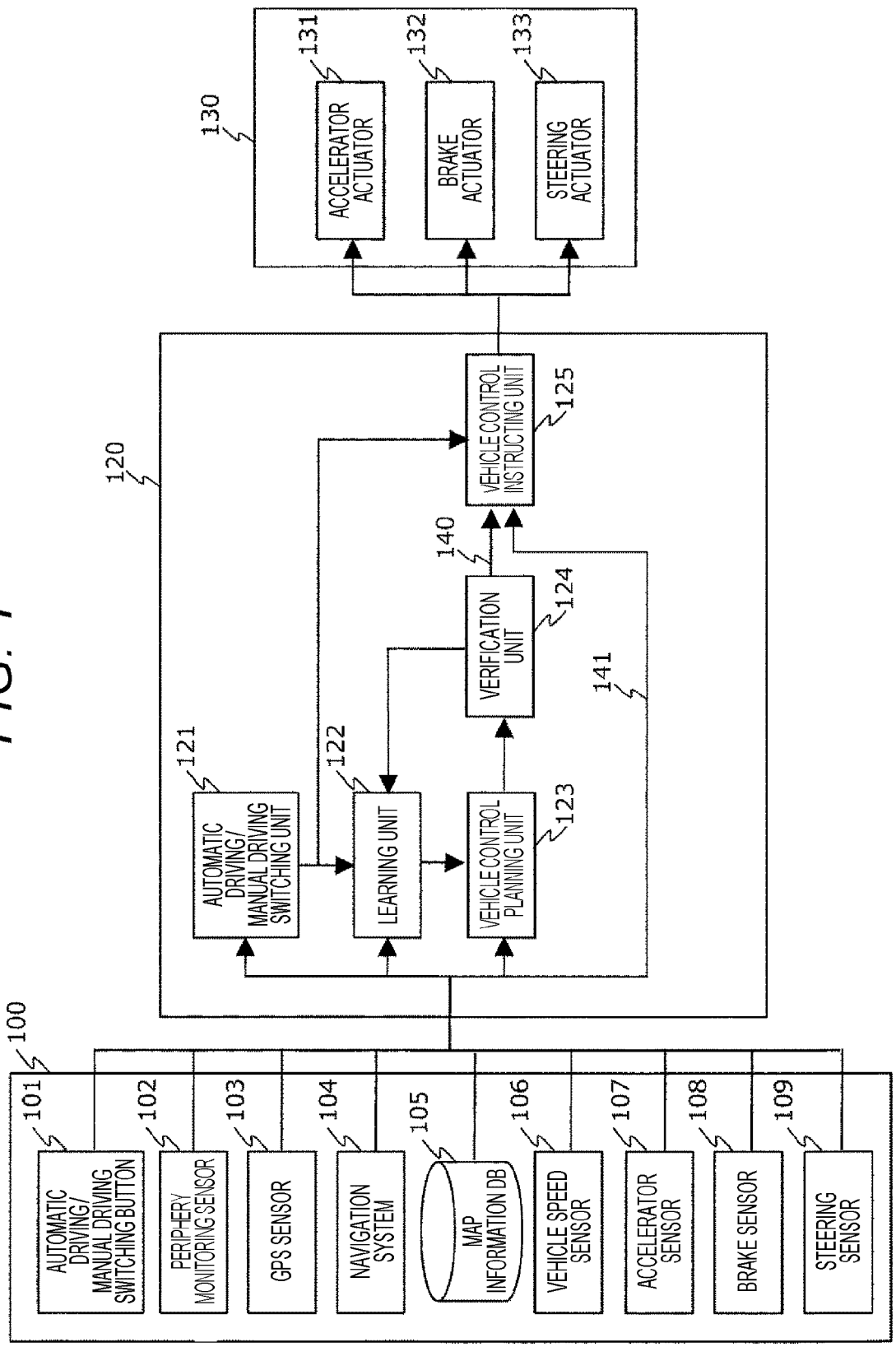
FIG. 1 is a block diagram illustrating a configuration example of an automatic driving system according to a first embodiment.

FIG. 1 is a block diagram illustrating an example of a configuration diagram of an automatic driving system using a vehicle control device of the present embodiment. As illustrated in FIG. 1, the automatic driving system using the vehicle control device according to the present invention includes an input unit 100, a vehicle control device 120, and an output unit 130.

The input unit 100 has a function of inputting information required for manual driving and automatic driving, and includes, for example, an automatic driving/manual driving switching button 101, a periphery monitoring sensor 102, a global positioning system (GPS) sensor 103, a navigation system 104, a map information data base (DB) 105, a vehicle speed sensor 106, an accelerator sensor 107, a brake sensor 108, and a steering sensor 109.

The automatic driving/manual driving switching button 101 is a button for enabling a driver to switch an operation mode between automatic driving and manual driving, and is installed as a physical switch. A button may be displayed on a touch panel type display device not illustrated in FIG. 1, and the driver may operate this button.

The periphery monitoring sensor 102 acquires information on a peripheral environment of a host vehicle. The periphery monitoring sensor extracts for example, moving objects such as vehicles and bikes, bicycles and pedestrians around the host vehicle, stationary objects such as parked vehicles and pylons, and lanes, stop lines, signs, traffic lights on road surfaces, and acquires information such as classifications, distances from the host vehicle, and directions seen from the host vehicle. The periphery monitoring sensor is a recognition processing unit that extracts the information from information acquired by sensors of cameras, millimeter-wave radars, and sonars.

The GPS sensor 103 has a function of measuring a position of the host vehicle by using the GPS.

The navigation system 104 has a function of guiding the host vehicle to a set destination, and presents a route to the destination by checking the position of the host vehicle acquired by the GPS sensor 103 and a position of the destination on a map stored in a map information DB to be described below.

The map information DB 105 is a database in which map data is registered, and includes information on intersections, and curvature, slope, and lane information of roads in addition to map information.

The vehicle speed sensor 106 is a sensor that measures a speed of the host vehicle, and has, for example, a function of detecting a rotational speed of wheels and calculating the speed of the host vehicle from the rotational speed.

The accelerator sensor 107 and the brake sensor 108 detect operation amounts of an accelerator pedal and a brake pedal, respectively.

The steering sensor 109 detects a steering amount and a steering direction of a steering wheel.

Next, the vehicle control device 120 includes an automatic driving/manual driving switching unit 121, a learning unit 122, a vehicle control planning unit 123, a verification unit 124, and a vehicle control instructing unit 125. The vehicle control device 120 has a function of issuing a vehicle control instruction corresponding to each driving mode of automatic driving and manual driving, and issues the vehicle control instruction based on a plan of the vehicle control planning unit during the automatic driving. Meanwhile, during the manual driving, the vehicle control device acquires the operation amounts when the driver operates the accelerator, the brake, and the steering wheel from the accelerator sensor 107, the brake sensor 108, and the steering sensor 109, respectively, and issues the vehicle control instruction based on the operation amounts. Hereinafter, each block will be described.

Figure 2:
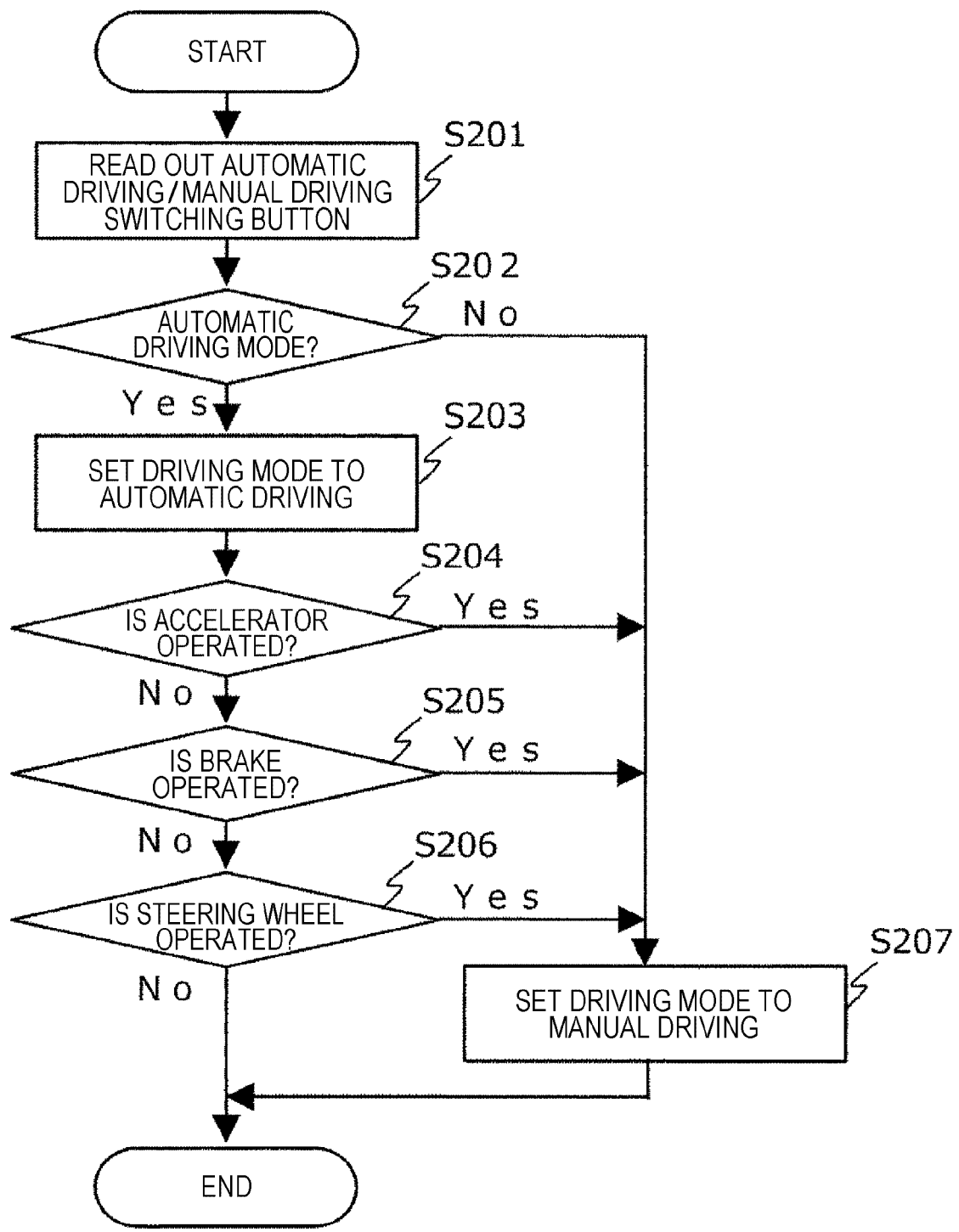
FIG. 2 is flowchart illustrating an example of a processing procedure of an automatic driving/manual driving switching unit.

The automatic driving/manual driving switching unit 121 has a function of switching between the driving modes as to whether the vehicle is controlled by the automatic driving or the manual driving. An operation of the automatic driving/ manual driving switching unit will be described in more detail with reference to FIG. 2.

Initially, the information of the automatic driving/manual driving switching button 101 is read out (S201). Subsequently, it is determined whether the setting of the switching button read out above is the automatic driving mode or the manual driving mode (S202). When the setting of the switching button is the automatic driving mode (when the determination result in S202 is Yes), the process proceeds to S203. Meanwhile, when the setting of the switching button is the manual driving mode (when the determination result in S202 is No), the driving mode is set to the manual driving (S207), and the process is ended.

In S203, the driving mode is set to the automatic driving.

Subsequently, it is determined whether the driver operates an accelerator (S204). When the driver operates the accelerator (when the determination result in S204 is Yes), the driving mode is set to the manual driving (S207). Meanwhile, when the driver does not operate the accelerator (when the determination result in S204 is No), it is determined whether or not the driver operates a brake and a steering wheel in S205 and S206. When the driver operates the brake and the steering wheel (when the determination results in S205 and S206 are Yes), the driving mode is set to the manual driving (S207). Meanwhile, when the driver does not operate the brake and the steering wheel (when the determination results in S205 and S206 are No), the process is ended while maintaining the driving mode in the automatic driving mode.

Returning to the description of FIG. 1, an operation of the learning unit 122 will be subsequently described with reference to FIG. 3.

Initially, it is determined whether or not a traveling position of the host vehicle is a driving characteristic application target scene from the information of the periphery monitoring sensor 102, the GPS sensor 103, and the map information DB 105 (S301). Here, the driving characteristic application target scene is, for example, as follows.

When the driver performs changing of lanes such as merging or branching of lanes
When the vehicle stops by a traffic light or stop line
When the vehicle starts from a state in which the vehicle stops by the aforementioned traffic light or stop line.
When the vehicle turns left at an intersection
When the vehicle travels while avoiding obstacles such as parked vehicles When the traveling position of the host vehicle is the driving characteristic application target scene (when the determination result in S301 is Yes), the process proceeds to S302. When the traveling position of the host vehicle is not the driving characteristic application target scene (when the determination result of S301 is No), the process is ended.

In S302, it is determined whether the driving mode is the automatic driving mode or the manual driving mode from the driving mode notified from the automatic driving/manual driving switching unit 121. When the driving mode is the manual driving mode (when the determination result in S302 is Yes), the process proceeds to S303. Meanwhile, when the driving mode is the automatic driving mode (when the determination result in S302 is No), the process proceeds to S306.

In S303, it is determined whether the driving characteristics are acquired or are not acquired. When the driving characteristics are acquired (when the determination result in S303 is Yes), the process is ended. Meanwhile, when the driving characteristics are not acquired (when the determination result in S303 is No), the driving characteristics of the driver are acquired by using the information of the vehicle speed sensor 106, the accelerator sensor 107, the brake sensor 108, and the steering sensor 109 (S304), and the acquired driving characteristics are retained (S305).

Subsequently, when the determination result of S302 is No (when the driving mode is the automatic driving), it is determined whether the driving characteristics are acquired or are not acquired (S306). When the driving characteristics are acquired (when the determination in S306 is Yes), the driving characteristics are notified to the vehicle control planning unit (S307). Meanwhile, when the driving characteristics are not acquired (when the determination result of S306 is No), the process is ended.

Subsequently, it is determined whether or not an alarm is notified from the verification unit 124 of FIG. 1 (S308). When the alarm is notified (when the determination result of S308 is Yes), the process proceeds to S309. Meanwhile, when the alarm is not notified (when the determination result of S308 is No), the process is ended.

In S309, it is determined whether the driving characteristics corresponding to the notified alarm are acquired or are not acquired (S309). When the driving characteristics corresponding to the alarm are acquired (when the determination result in S309 is Yes), the driving characteristics corresponding to the alarm are notified to the vehicle control planning unit (S311). Meanwhile, when the driving characteristics corresponding to the alarm are not acquired (when the determination result in S309 is No), the driving characteristics are corrected according to the contents of the alarm (S310), and the corrected driving characteristics are retained (S305).

Figure 4:
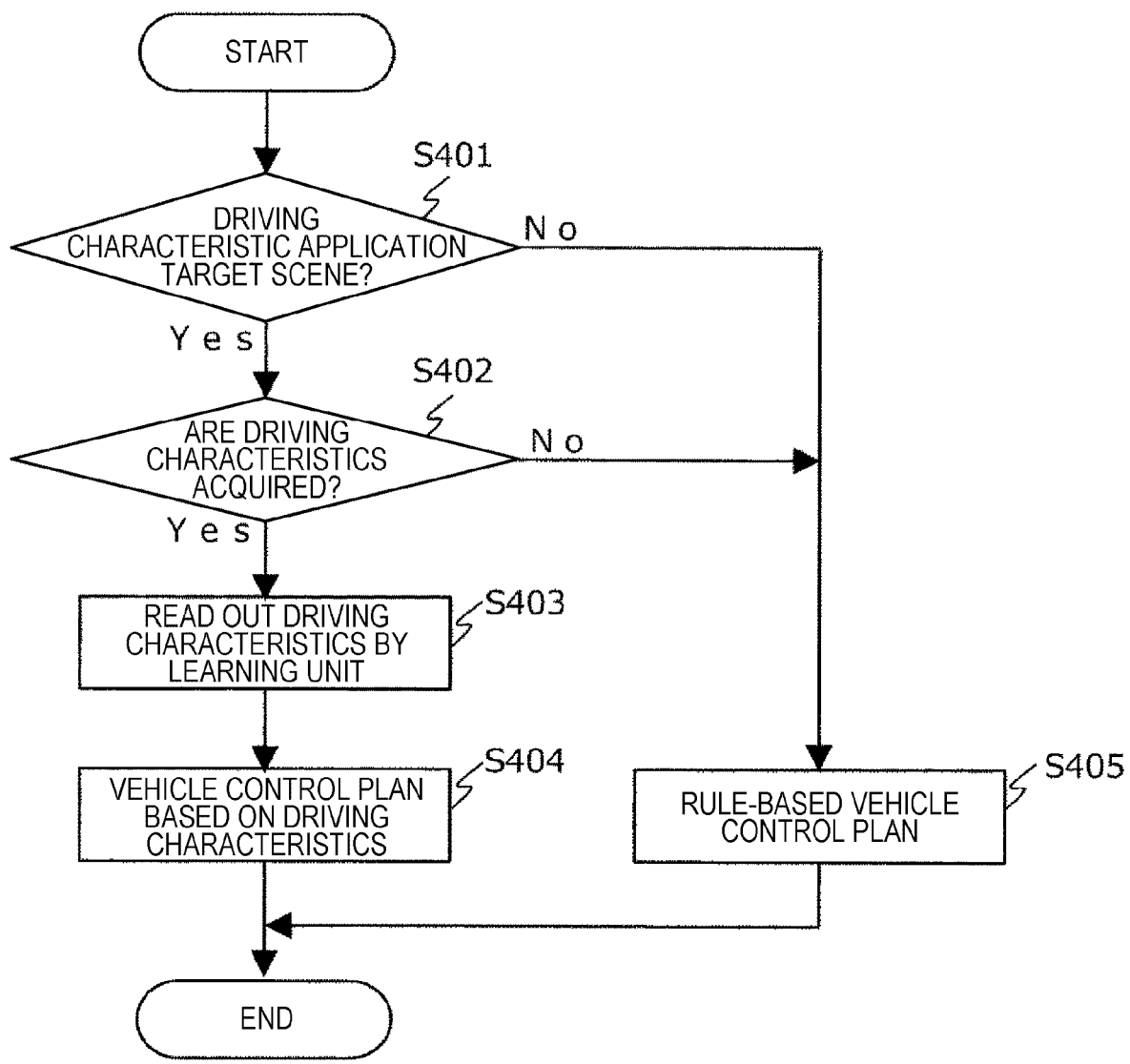
FIG. 4 is a flowchart illustrating an example of a processing procedure of a vehicle control planning unit.

Returning to the description of FIG. 1, the vehicle control planning unit 123 has a function of executing a vehicle control plan in the automatic driving mode. An operation of the vehicle control planning unit 123 will be described in more detail with reference to FIG. 4.

Initially, it is determined whether or not the traveling position of the host vehicle is the driving characteristic application target scene from the information of the periphery monitoring sensor 102, the GPS sensor 103, and the map information DB 105 (S401). When the traveling position of the host vehicle is the driving characteristic application target scene (when the determination result in S401 is Yes), the process proceeds to S402. When the traveling position of the host vehicle is not the driving characteristic application target scene (when the determination result of S401 is No), a rule-based vehicle control plan is executed (S405), and the present process is ended. Here, the rule-based vehicle control plan is a control plan that complies with traffic rules. This vehicle control plan may not match with the preference of the driver. However, in this control plan, safe and smooth traveling is verified in advance.

In S402, it is determined whether the driving characteristics are acquired. When the driving characteristics are not acquired (when the determination result of S402 is No), the process proceeds to S405. When the driving characteristics are acquired (when the determination result in S402 is Yes), the process proceeds to S403.

In S403, the driving characteristics are read by the learning unit 122 of FIG. 1, and the process proceeds to S404.

In S404, the vehicle control plan is executed based on the driving characteristics, and the process is ended.

Returning to the description of FIG. 1, the verification unit 124 verifies whether or not a traveling plan generated by the vehicle control planning unit 123 has an event causing a problem in performing the safe and smooth traveling for a period from a current point of time to a point a predetermined time later with consideration for moving objects, stationary objects, and lane information around the host vehicle input from the periphery monitoring sensor 102. As the verification result, when there is no problem, vehicle control plan information planned by the vehicle control planning unit 123 is output to the vehicle control instructing unit 125. Meanwhile, when the event causing the problem in the safe and smooth traveling is detected as the verification result, an alarm is output the learning unit 122 based on the detected event.

When the driving mode notified from the automatic driving/manual driving switching unit is the manual driving mode, the vehicle control instructing unit 125 issues a vehicle control instruction based on operation amounts 141 acquired by the accelerator sensor 107, the brake sensor 108, and the steering sensor 109. On the other hand, when the driving mode notified from the automatic driving/manual driving switching unit is the automatic driving mode, the vehicle control instruction is issued based on the vehicle control plan 140 output from the verification unit 124.

The output unit 130 includes an accelerator actuator 131, a brake actuator 132, and a steering actuator 133. The accelerator actuator 131, the brake actuator 132, and the steering actuator 133 controls a driving system, a braking system, and a steering system according to instructions from the vehicle control instructing unit 125.

Hereinafter, an operation of the vehicle control device 120 will be described in more detail.

Figure 5:
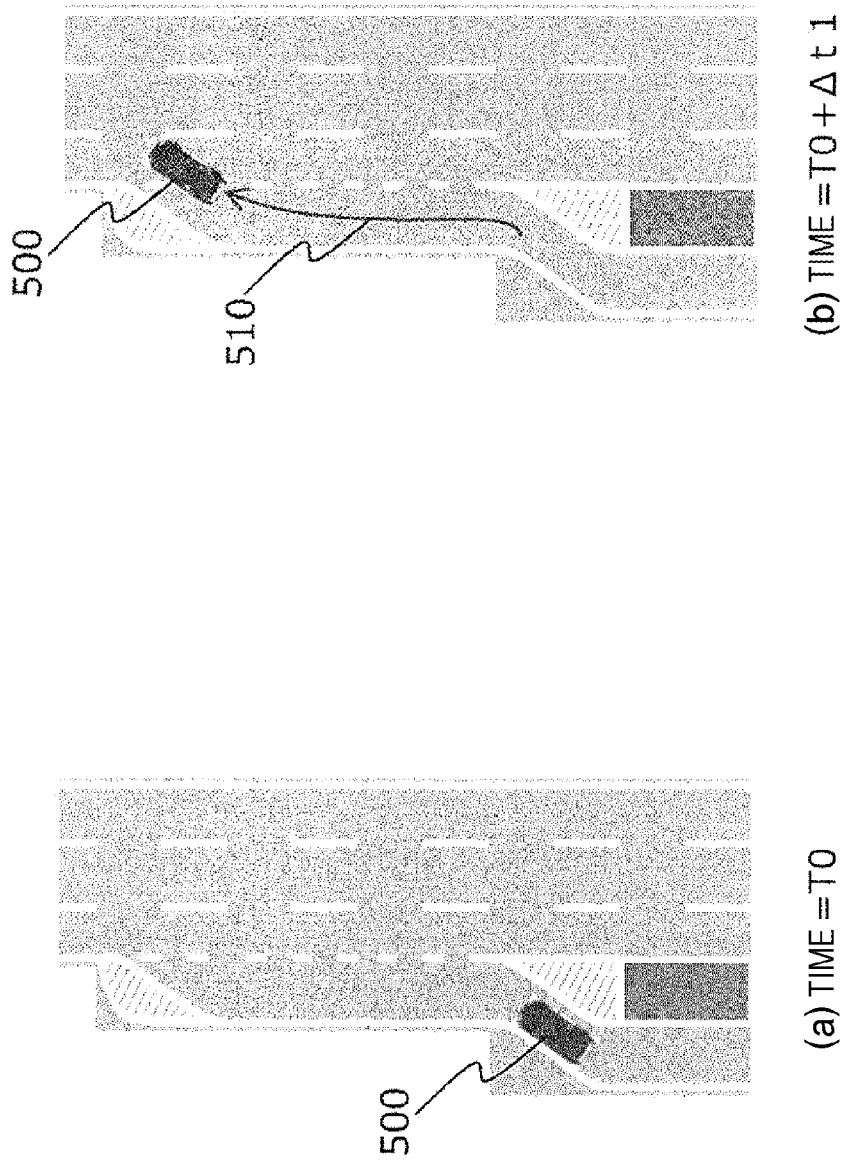
FIG. 5 is a diagram illustrating an operation example of merging of lanes in a manual driving mode.

FIG. 5 illustrates an operation example when the driver merges lanes in the manual driving mode. In FIG. 5, reference sign 500 denotes the host vehicle. Reference sign 510 denotes a traveling history when the host vehicle travels for a period from time T0 to time T0+Δt1. In this case, the learning unit 122 acquires, as an examples of the driving characteristics of the driver during the merging of the lanes in FIG. 5, driving characteristic items illustrated in FIG. 6, and retains, as the driving characteristics of the driver, the acquired driving characteristic items.

Next, FIG. 7 illustrates an operation example when the driver drives on the same road as the road in FIG. 5 in the automatic driving mode and merges the lanes after the driving characteristics are learned. In FIG. 7, the same reference signs are assigned to objects having the same meaning as in FIG. 5. Unlike the case of FIG. 5, FIG. 7 illustrates a case where there is a vehicle 700 traveling on the main lane at time=T0.

The vehicle control planning unit 123 reads out values of the items of FIG. 6 as the driving characteristics held in the learning unit 122 at a timing of time=T0 illustrated in FIG. 7(*a*), and executes the vehicle control plan. Reference sign 710 in FIG. 7 denotes a target route generated by the vehicle control planning unit 123, and FIG. 7(*b*) illustrates a case where positions of the host vehicle 500 and the vehicle 700 traveling on the main lane after a time elapses by Δt1 from the time of FIG. 7(*a*) are predicted.

The verification unit 124 verifies whether the target route 710 planned by the vehicle control planning unit 123 has an event that hinders the safe and smooth traveling of the host vehicle.

FIG. 8 illustrates examples of items to be verified by the verification unit 124. In FIG. 8, alarm ID=1 is detected when the host vehicle travels according to the driving characteristics of FIG. 6 and a distance between the host vehicle and a preceding vehicle is predicted to be less than a preset minimum distance. Similarly, alarm ID=2 is detected when a distance between the host distance and a following vehicle is predicted to be less than the preset minimum distance.

Alarm ID=3 is detected when the host vehicle travels according to the driving characteristics of FIG. 6 and a speed of the host vehicle is predicted to be greater than a preset speed or a speed limit. Alarm ID=4 is detected when the host vehicle travels according to the driving characteristics of FIG. 6 and a distance between the host vehicle and a merging terminal end is predicted to be less than a predetermined remaining distance.

In the example of FIG. 7, since a predicted vehicle distance La between the host vehicle and the vehicle 700 traveling on the main lane is less than the preset minimum distance between the host vehicle and the preceding vehicle at time=T0+Δt1, the alarm ID=1 of FIG. 8 is detected by the verification unit 124, and is notified to the learning unit 122.

The learning unit 122 changes the learned driving characteristics according to the alarm ID notified from the verification unit 124. In the aforementioned example, since alarm ID=1 (insufficient distance to the preceding vehicle) is notified, the learned driving characteristics are changed such that the host vehicle is not too close to the preceding vehicle too much. Examples of the change are illustrated in FIG. 9. FIG. 9(a) illustrates driving characteristics before the change, which are the same as the driving characteristics of FIG. 6. In FIG. 9(b), acceleration characteristics are changed to a1 less than a0 of FIG. 9(a).

FIG. 10 illustrates an example of a merging operation when the vehicle control planning unit 123 executes the vehicle control plan at a timing of time=T0 along the driving characteristics of FIG. 9(b). Although a target route 1010 has the same track as the target route 710 in FIG. 7, an acceleration at the time of merging is decreased, and thus, it is predicted that the host vehicle 500 is still traveling on the lane to be merged into at time=T0+Δt1. Further, at a time when the host vehicle merges into the main lane=T0+Δt1+Δt2 (FIG. 10(c)), the predicted distance between the vehicle 700 traveling on the main lane and the host vehicle 500 is Lb.

The verification unit 124 verifies whether the target route 1010 planned by the vehicle control planning unit 123 has the event that hinders the safe and smooth traveling of the host vehicle.

In the example of FIG. 10, when the host vehicle merges into the main lane at time=T0+Δt1+Δt2, since the predicted vehicle distance Lb between the host vehicle and the vehicle 700 traveling on the main lane is secured to be equal to or greater than the preset minimum distance between the host vehicle and the preceding vehicle, any alarm illustrated in FIG. 8 is not detected, and the vehicle control plan information planned by the vehicle control planning unit 123 is output to the vehicle control instructing unit 125.

In this case, the learning unit 122 newly retains the driving characteristic items illustrated in FIG. 9(b) together with the alarm ID.

As described above, in the vehicle control device according to the first embodiment of the present invention, the driving characteristics are corrected according to the alarm item detected by the verification unit at the time of applying the driving characteristics acquired during the manual driving to the automatic driving, and thus, it is possible to realize the automatic driving corresponding to the driving characteristics of the driver as much as possible even when a vehicle peripheral state is different from a vehicle peripheral state during the manual driving.

Figure 3:
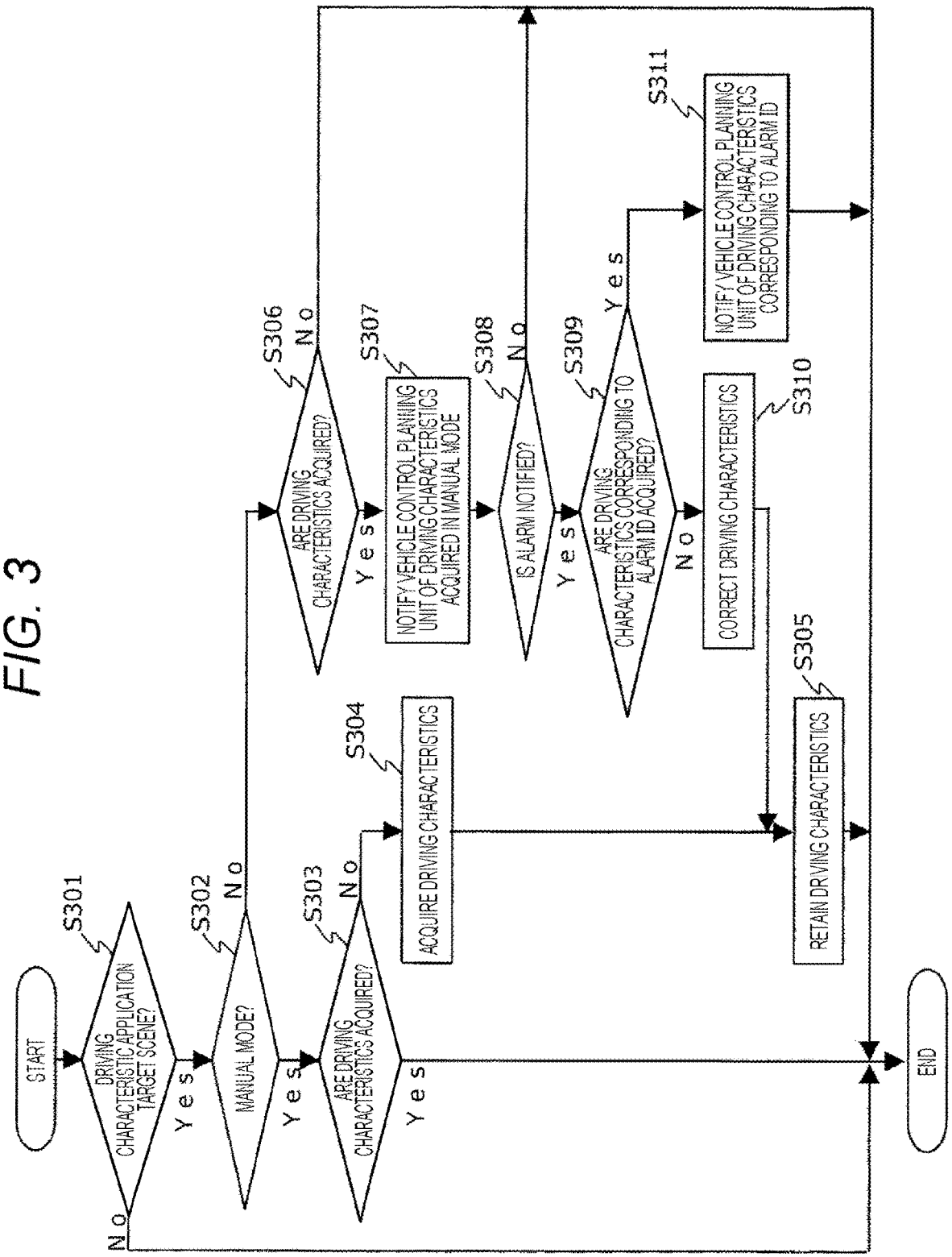
FIG. 3 is a flowchart illustrating an example of a processing procedure of a learning unit.

Although the aforementioned example illustrates the operation example when the alarm ID=1 is initially notified during the automatic driving, since the corrected driving characteristics are retained in the learning unit (S310→S305 of FIG. 3), when the same alarm is notified on the next time and thereafter, it is possible to cope with the automatic driving only by reading out the retained driving characteristics (S311 of FIG. 3).

In the aforementioned example, the operation example in which the values of the driving characteristics (FIG. 9(b)) after the driving characteristics are changed according to the alarm ID are retained is illustrated. However, as illustrated in FIG. 9(c), before the change, a method of determining whether or not the driving characteristics acquired during the manual driving are changed and presenting a guideline for increasing or decreasing the characteristic values when it is determined that the driving characteristics are changed may be used. In this case, a method of calculating the changed specific values in the vehicle control planning unit 123 may be used.

Further, although the aforementioned example illustrates the correction example of the driving characteristics when the alarm ID=1 is notified, in a case where another alarm ID illustrated in FIG. 6 occurs or a plurality of alarms occur simultaneously, since it is possible to correct the driving characteristics and it is possible to retain the corrected driving characteristics whenever the alarm occurs for various alarm conditions, it is possible to realize the automatic driving according to the driving characteristics of the driver as much as possible so as to correspond to various driving environments.

Although it has been described in the aforementioned example that an operation example in which the item of the acceleration is changed for the driving characteristics illustrated in FIG. 6 is illustrated as illustrated in FIG. 9(b), other items may be changed. Other examples of the change is illustrated in FIG. 11. FIG. 11(a) illustrates driving characteristics before the change, which are the same as the driving characteristics of FIG. 6. In FIG. 11(b), merging point characteristics are changed to L1 less than L0 of FIG. 11(a).

Figure 12:
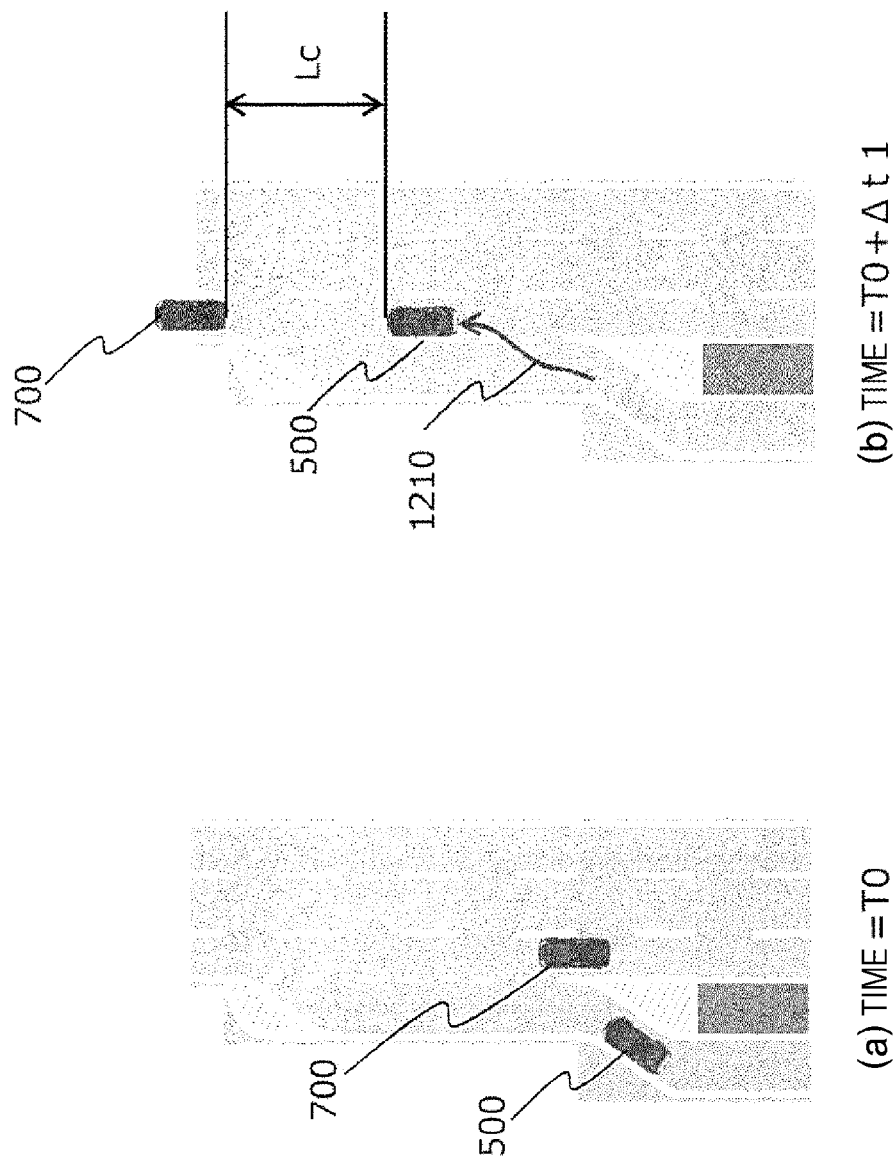
FIG. 12 is a diagram illustrating an operation example of the merging of lanes in the automatic driving mode after the driving characteristics are changed.

FIG. 12 illustrates an example of the merging operation when the vehicle control planning unit 123 executes the vehicle control plan at a timing of time=T0 according to the driving characteristics of FIG. 11(b). In FIG. 12(b), the characteristic value of the merging point is decreased, and thus, the merging is manually performed before the change, and an acceleration period is shortened. As a result, a predicted vehicle distance Lc between the host vehicle and the vehicle 700 traveling on the main lane is secured to be equal to or greater than the preset minimum distance between the host vehicle and the preceding vehicle, any alarm illustrated in FIG. 8 is not detected, and the vehicle control plan information planned by the vehicle control planning unit 123 is output to the vehicle control instructing unit 125. As described above, it is possible to realize the automatic driving according to the driving characteristics of the driver as much as possible when the vehicle peripheral state is different from the vehicle peripheral state in the manual driving by changing the other item of the driving characteristics.

Although it has been described in the aforementioned example that the operation example in which the value of any one item is changed for the driving characteristics illustrated in FIG. 6 is illustrated, a plurality of items may be simultaneously changed. In this case, since a change amount of each item can be reduced compared to a case where only one item is changed, it is possible to suppress a sense of incompatibility of the driver.

Second Embodiment

Hereinafter, a vehicle control device according to a second embodiment of the present invention will be described.

The operation example in which the automatic driving according to the driving characteristics of the driver as much as possible even when the vehicle peripheral state is different from the vehicle peripheral state during the manual driving by changing one or more items of the driving characteristics acquired during the manual driving has been described in the first embodiment. However, in the present embodiment, an operation for changing the driving characteristics according to the preference of the driver will be described.

In this embodiment, a lane merging operation is performed multiple number of times in the manual driving mode illustrated in FIG. 5, and thus, the driving characteristics of the acceleration, the maximum steering angle, and the merging point illustrated in FIG. 6 are acquired by multiple number of times. Subsequently, representative driving characteristics of the driver are calculated from the characteristic values acquired by multiple number of times. A method of calculating an average value of the values acquired by multiple number of times and a method of giving a median value or a repetition value are considered as a method of calculating the representative driving characteristics.

Subsequently, for each item, a variation between the values of the driving characteristics acquired by multiple number of times and the representative driving characteristics is calculated. The variation can be calculated by using the sum of absolute values of differences between the driving characteristics and the representative driving characteristics or the mean square error. Since the driving habit of the driver emerges more strongly as the value of the variation of each item becomes smaller, a priority is set to be high.

Examples of the calculated representative driving characteristics are illustrated in FIG. 13. In FIG. 13, since the item of the merging point has the smallest variation, 1 is given as the highest priority. Since the item of the acceleration has the largest variation, and a lowest priority is given to the acceleration.

In the automatic driving mode, when the alarm is notified by the verification unit 124 of FIG. 1, it is assumed that the change is made from the driving characteristic item with low priority. As an example, similar to the first embodiment, when the verification unit 124 detects alarm ID=1 (insufficient distance to the preceding vehicle) in the merging operation illustrated in FIG. 7 and notifies the learning unit 122 of this alarm, since the lowest priority is set to the item of the acceleration in the example of FIG. 13, the learning unit 122 changes the value of the acceleration.

As described above, in the vehicle control device according to the second embodiment of the present invention, the priority is given to each item of the driving characteristics acquired during the manual driving, and the change is made from the item with the low priority when the driving characteristics are changed during the automatic driving. By doing this, it is possible to realize the automatic driving according to the driving characteristics of the driver as much as possible even when the vehicle peripheral state is different from the vehicle peripheral state during the manual driving.

Third Embodiment

Hereinafter, a vehicle control device according to a third embodiment of the present invention will be described.

A configuration diagram of an automatic driving system using the vehicle control device of the present embodiment is the same as the configuration diagram of FIG. 1. Here, in the first embodiment and second embodiment, the operation of the vehicle control planning unit based on the driving characteristics is performed according to the processing procedure of reading out the driving characteristics by the learning unit (S403 of FIG. 4), executing the vehicle control plan based on the driving characteristics (S404 of FIG. 4), correcting the driving characteristics for the generated vehicle control plan by the learning unit 122 when the alarm is detected by the verification unit 124 (S310 of FIG. 3), and executing the vehicle control plan for the corrected driving characteristics again.

In contrast, an operation of the vehicle control planning unit 123 of the present embodiment will be described with reference to FIG. 14.

Initially, it is determined whether or not the traveling position of the host vehicle is the driving characteristic application target scene from the information of the periphery monitoring sensor 102, the GPS sensor 103, and the map information DB 105 (S1401). When the traveling position of the host vehicle is the driving characteristic application target scene (when the determination result in S1401 is Yes), the process proceeds to S1402. When the traveling position of the host vehicle is not the driving characteristic application target scene (when the determination result in S1401 is No), the rule-based vehicle control plan is executed (S1408), and the present process is ended.

In S1402, it is determined whether the driving characteristics are acquired. When the driving characteristics are not acquired (when the determination result of S1402 is No), the process proceeds to S1408. When the driving characteristics are acquired (when the determination result of S1402 is Yes), the process proceeds to S1403.

In S1403, the driving characteristics are read out by the learning unit 122 of FIG. 1, and the process proceeds to S1404.

In S1404, the vehicle control plan based on the driving characteristics is executed.

Subsequently, in S1405, it is confirmed whether or not the alarm is notified for the vehicle control plan generated in S1404. When the alarm is not notified (when the determination result in S1405 is No), the process is ended. Meanwhile, when the alarm is notified (when the determination result in S1405 is Yes), the rule-based vehicle control plan is executed (S1406), and the driving characteristics used in the rule-based vehicle control plan is notified to the learning unit 122 (S1407).

The learning unit 122 changes the driving characteristics of the driver according to the alarm ID notified from the verification unit 124 based on the rule-based driving characteristics notified from the vehicle control planning unit 123 in S1407.

Similar to the first embodiment, an example in which when the driving characteristics during the merging of the lanes in FIG. 5 are acquired as illustrated in FIG. 6 and the automatic driving is to be performed based on the driving characteristics of FIG. 6, the insufficient distance to the preceding vehicle (alarm ID=1) for the host vehicle and the vehicle 700 occurs as illustrated in FIG. 7 (S1405 of FIG. 14) will be described below.

Figure 14:
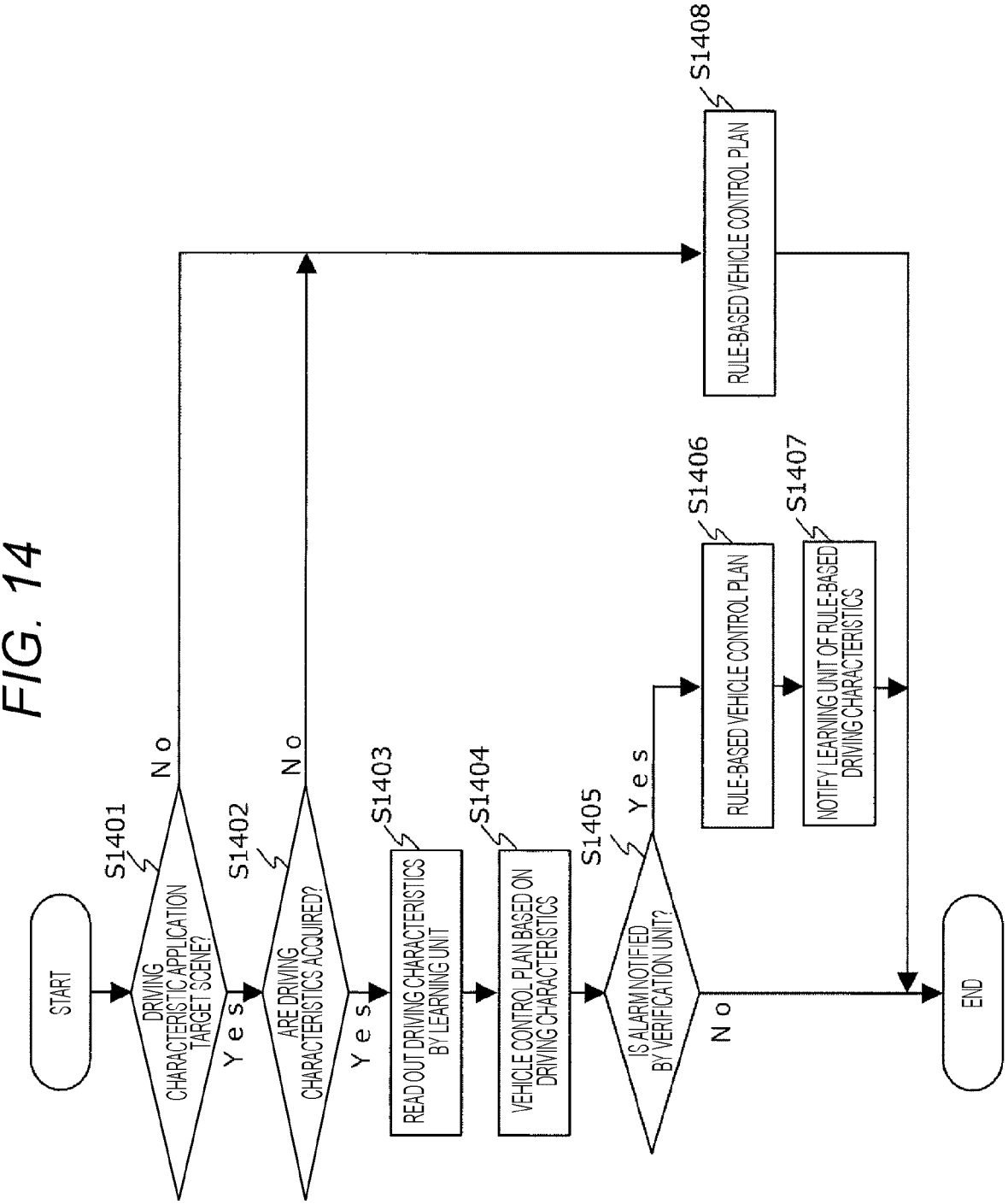
FIG. 14 is a flowchart illustrating an example of a processing procedure of a vehicle control planning unit.

It is assumed that the vehicle control planning unit 123 executes the rule-based vehicle control plan (S1406 of FIG. 14). The rule-based driving characteristics in this case are illustrated in FIG. 15. The vehicle control planning unit 123 notifies the learning unit 122 of the rule-based driving characteristics illustrated in FIG. 5 (S1407).

Among the driving characteristic items, the learning unit 122 changes the driving characteristic value (a0 [m/s$^2$]) acquired during the manual driving to the characteristic value of the rule-based driving characteristics ar [m/s²] for the item of the acceleration (FIG. 16(b)), and retains the chanced value together with the alarm ID.

Accordingly, when the vehicle travels at the lane merging point in the automatic driving mode, the changed driving characteristics (FIG. 16(b)) retained in the learning unit are read out, and the vehicle control plan and the verification are executed according to the present characteristics.

In this case, when the alarm is not detected in the changed driving characteristic (FIG. 16(b)), the vehicle control instruction according to the present driving characteristics is issued. Meanwhile, when the alarm occurs, the vehicle control plan is switched to the rule-based vehicle control plan (S1406 of FIG. 14), and the driving characteristics are changed again by the learning unit 122.

As described above, in the vehicle control device according to the third embodiment of the present invention, the driving characteristics are switched to the rule-based driving characteristics when the alarm is detected by the verification unit at the time of applying the driving characteristics acquired during the manual driving to the automatic driving. Thus, it is possible to continue the automatic driving by promptly canceling the alarm, and it is possible to perform the safe and smooth automatic driving by changing the driving characteristics of the driver based on the rule-based driving characteristics.

In the example of FIG. 16(b), the rule-based driving characteristic value (ar) is used with no change as the driving characteristics of the acceleration, but a method of searching for an optimum value with which the alarm is canceled by changing the characteristic value so as to be close ar from a0 acquired during the manual driving little by little may be used.

From the aforementioned embodiments, the terms can be expressed as follows. There is provided a vehicle control device capable of switching between manual driving in which a vehicle travels according to an operation of a driver and automatic driving in which the vehicle automatically travels according to a traveling plan. The device includes a vehicle control planning unit that plans the traveling plan, and a verification unit that verifies a traveling state of the vehicle based on the traveling plan. The traveling plan is planned according to learning related to driving characteristics of the driver during the manual driving and a result of learning related to a verification result of the verification unit.

The vehicle control device further includes a learning unit that executes the learning related to the verification result of the verification unit and the learning of the driving characteristics of the driver during the manual driving. The vehicle control planning unit plans the traveling plan based on a learning result of the learning unit.

The verification unit has a plurality of preset alarm items, and selects a corresponding alarm item among the alarm items according to a dangerous event when the dangerous event is detected as a result of verifying the traveling state of the vehicle based on the traveling plan, and the traveling plan is planned based on learning corresponding to the selected alarm item and the learned result.

The learning related to the driving characteristics of the driver during the manual driving is to learn driving characteristics and priorities for a plurality of preset driving characteristic items, and the learning related to the verification result of the verification unit is to preferentially learn a driving characteristic item with a low priority.

The verification unit selects a rule-based traveling plan retained in advance when a dangerous event is detected as a result of verifying the traveling state of the vehicle based on the traveling plan, and the learning related to the verification result of the verification unit is to learn according to driving characteristics of the rule-based traveling plan.

According to the aforementioned embodiments, when the automatic driving is performed by using the driving characteristics of the driver acquired during the manual driving, it is possible to realize the safe and smooth automatic driving while maintaining the driving characteristics of the driver as much as possible by verifying whether or not there is an event that hinders the safe and smooth traveling by using the driving characteristics acquired during the manual driving depending on the vehicle peripheral state of the host vehicle and correcting the driving characteristics depending on the verification result.

REFERENCE SIGNS LIST 100 input unit
101 automatic driving/manual driving switching button
102 periphery monitoring sensor
103 GPS sensor
104 navigation system
105 map information DB
106 vehicle speed sensor
107 accelerator sensor
108 brake sensor
109 steering sensor
120 vehicle control device
121 automatic driving/manual driving switching unit
122 learning unit
123 vehicle control planning unit
124 verification unit
125 vehicle control instructing unit
130 output unit
131 accelerator actuator
132 brake actuator
133 steering actuator
500 host vehicle
510 travel history during manual driving
700 vehicle traveling on main lane
710, 1010, 1210 target route

The invention claimed is:

1. A vehicle control device capable of switching between manual driving in which a vehicle travels according to an operation of a driver and automatic driving in which the vehicle automatically travels according to a traveling plan, the device comprising:
   a vehicle controller configured to
      plan the traveling plan; and
      verify a traveling state of the vehicle based on the traveling plan,
   wherein the traveling plan is planned according to learning related to driving characteristics of the driver during the manual driving and a result of learning related to a verification result of the controller, and the controller implements the traveling plan to set a route of the vehicle,
   wherein the controller has a plurality of preset alarm items, and simultaneously selects corresponding alarm items among the alarm items according to an event when the event is detected as a result of verifying the traveling state of the vehicle based on the traveling plan, and
   the traveling plan is planned based on learning corresponding to the selected alarm item and the learned result.

2. The vehicle control device according to claim 1, wherein the controller is further configured to
perform the learning related to the verification result of the controller and the learning of the driving characteristics of the driver during the manual driving,
wherein the controller plans the traveling plan based on a learning result.

3. The vehicle control device according to claim 1, wherein the learning related to the driving characteristics of the driver during the manual driving is to learn driving characteristics and priorities for a plurality of preset driving characteristic items, and
the learning related to the verification result of the controller is to preferentially learn a driving characteristic item with a low priority.

4. The vehicle control device according to claim 1, wherein the controller selects a rule-based traveling plan retained in advance when a dangerous event is detected as a result of verifying the traveling state of the vehicle based on the traveling plan, and
the learning related to the verification result of the controller is to learn according to driving characteristics of the rule-based traveling plan.

5. The vehicle control device according to claim 1, wherein the preset alarm items include an alarm when a distance between a host vehicle and a merging terminal end is predicted to be less than a remaining distance.

6. The vehicle control device according to claim 1, wherein a plurality of driving characteristic items of the driver obtained during manual driving may be simultaneously changed to reduce incompatibility.

\* \* \* \* \*